United States Patent
O'Leary et al.

(10) Patent No.: US 7,415,807 B2
(45) Date of Patent: Aug. 26, 2008

(54) STRUCTURED ADHESIVE SYSTEM

(75) Inventors: Robert J. O'Leary, Newark, OH (US);
Harry Alter, Granville, OH (US);
Matthew J. Estes, Gahanna, OH (US)

(73) Assignee: Owens Corning Intellectual Capital LLC DE (US)

(*) Notice: Subject to any disclaimer, the term of this patent is extended or adjusted under 35 U.S.C. 154(b) by 147 days.

(21) Appl. No.: 11/198,521

(22) Filed: Aug. 5, 2005

(65) Prior Publication Data

US 2007/0031659 A1 Feb. 8, 2007

(51) Int. Cl.
*E04B 9/00* (2006.01)
*E04B 1/38* (2006.01)

(52) U.S. Cl. ............... 52/506.05; 52/506.01; 52/746.1; 428/131; 428/343; 428/352

(58) Field of Classification Search .............. 428/343, 428/354, 355 R
See application file for complete search history.

(56) References Cited

U.S. PATENT DOCUMENTS

| | | | |
|---|---|---|---|
| 4,356,676 A | 11/1982 | Hauptman | |
| 4,374,883 A | 2/1983 | Winslow | |
| 4,756,337 A | 7/1988 | Settineri | |
| 4,778,703 A | 10/1988 | Fontanilla | |
| 4,937,111 A | 6/1990 | Fontanilla | |
| 5,086,088 A | 2/1992 | Kitano et al. | |
| 5,300,171 A | 4/1994 | Braun et al. | |
| 5,585,178 A | 12/1996 | Calhoun et al. | |
| 5,593,759 A | 1/1997 | Vargas et al. | |
| 5,721,289 A | 2/1998 | Karim et al. | |
| 5,738,939 A | 4/1998 | Calhoun et al. | |
| 6,254,954 B1 | 7/2001 | Bennett et al. | |
| 6,376,070 B1 | 4/2002 | Nakasuga et al. | |
| 6,790,310 B2 | 9/2004 | Nakasuga et al. | |
| 2003/0157337 A1 | 8/2003 | Abend | |

FOREIGN PATENT DOCUMENTS

| | | |
|---|---|---|
| CA | 2525001 | 5/2006 |
| DE | 202 04 444 | 8/2002 |
| EP | 0 889 105 | 7/1999 |
| GB | 1379932 | 1/1975 |
| JP | 58171460 | 10/1983 |
| JP | 59058071 | 4/1984 |
| JP | 11029749 | 2/1999 |
| JP | 2000044898 | 2/2000 |

*Primary Examiner*—Hai Vo
*Assistant Examiner*—Anish Desai
(74) *Attorney, Agent, or Firm*—James J. Dottavio; Jason S. Fokens

(57) ABSTRACT

A construction configuration for a building includes a fixture adhered to a framing structure with an adhesive system. The adhesive system has an outer pressure sensitive adhesive material, an inner pressure sensitive adhesive material, a bonding adhesive material, and at least one spacer material. The spacer material has at least one opening for containing a desired quantity of the bonding adhesive material.

20 Claims, 2 Drawing Sheets

US 7,415,807 B2

STRUCTURED ADHESIVE SYSTEM

TECHNICAL FIELD

This invention relates to a construction configuration for a building having a fixture adhered to a framing structure with an adhesive system. The structured adhesive system is especially useful for attaching sheeting, fascia and manufactured stone to studs and other surfaces.

BACKGROUND OF THE INVENTION

In the construction industry, various types of fixture materials or building covering materials include, but are not limited to, manufactured stone products and types of sheathing including gypsum, drywall, plywood, oriented strand board (OSB), cement board, foam board, metal, sheet molding compound, bulk molding compound sheeting and the like.

Both interior sheathing and exterior sheathing materials are traditionally attached to a framing structure using screws and nails that penetrate through the sheathing and into the framing structure. Framing structures include, but are not limited to, wood, metal or concrete structures. In addition to using screws and nails it is common to use a rubber mastic or bonding adhesive to initially attach the sheathing to the framing structure as the sheathing is being installed. Nails and screws are still required, however, because the adhesives or mastics alone cannot hold the sheathing in place during the curing or drying process. It would be advantageous if a construction configuration could be improved to have a high "Green Strength" in order to ensure that the sheathing does not move during the cure process.

In certain construction industries, various types of construction materials are at least partially assembled prior to being brought to the construction site. For example, in factory built or manufactured homes, the construction configuration is frequently assembled prior to being installed in the home. An adhesive is typically applied to the face of the studs and interior drywall is laid on top of the studs. Nails are then used to attach the drywall to the studs while the glue dries. After the plumbing, electrical and insulation installations are complete the outside sheathing is applied.

In another example, in the manufacturing of roof materials, the framing structure is assembled on top of a ceiling gypsum board. When the ceiling framing structure is complete the joists are adhered to the ceiling gypsum board with a polyurethane spray foam applied to the corner of the gypsum board and the joist. Nails or screws are not commonly used.

In another example, manufactured stone products are attached to a framing structure having multiple layers of materials. Typically, an OSB or plywood sheathing is attached to a wall. Then, a waterproof barrier is applied over the plywood. An expanded metal lathe is nailed onto the sheathing to give flexural stability. A coat of quickset mortar is applied to the expanded metal lathe and cured for 24 to 48 hours. After sufficient time has passed to insure curing of the quickset mortar, the manufactured stone is then attached to the wall with additional mortar.

It would also be advantageous if the use of the metal lathe and the mortar could be eliminated so that the installation of such product could be accomplished in one day. Without the use of the metal lathe and mortar, there is no need to wait for the first mortar coat to dry before returning to finish the installation.

It would also be advantageous if a construction configuration could be improved to make the installation of various construction materials easier to use while simultaneously providing increased immediate adhesive strength and long-term bonding strength to the construction configuration.

It would also be advantageous to provide a novel and improved construction configuration which, while entirely eliminating the need for fasteners such as nails and screws, enables a more secure construction configuration to be manufactured and installed.

The invention will be more readily understood from the following description of a preferred embodiment thereof given, by way of example, with reference to the accompanying drawings.

SUMMARY OF THE INVENTION

The above objects as well as other objects not specifically enumerated are achieved by a construction configuration for a building where a fixture is adhered to a framing structure of the building with an adhesive system.

According to one aspect, the adhesive system includes a first pressure sensitive adhesive material, a second pressure sensitive adhesive material, and a bonding adhesive material. The pressure sensitive adhesive materials provide adherence of the fixture to the framing structure at a first rate, while the bonding adhesive material provides adherence of the fixture to the framing structure at a second rate which is typically longer in time than the first rate for the pressure sensitive adhesive material.

The adhesive system includes a spacer material which defines an opening for containing a desired quantity of the bonding adhesive material. The spacer material can comprise a material having acoustic isolation and/or damping characteristics.

Also, in certain embodiments, the pressure sensitive adhesive materials and the bonding adhesive material are inert with respect to each other such that no unfavorable chemical reaction occurs between the pressure sensitive adhesive materials and the bonding adhesive material.

Various objects and advantages of this invention will become apparent to those skilled in the art from the following detailed description of the preferred embodiment, when read in light of the accompanying drawings.

DETAILED DESCRIPTION OF THE INVENTION

Figure 1:
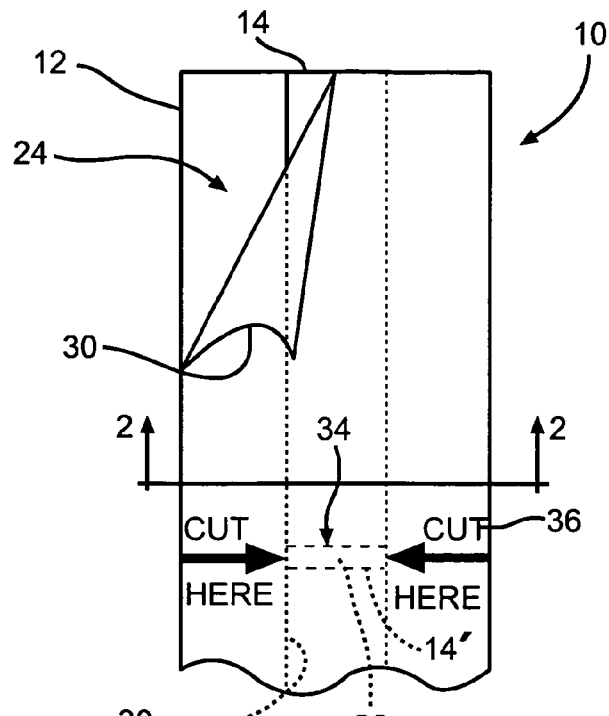
FIG. 1 is a top view, partially in phantom, of an adhesive system.

According to one aspect, the construction configuration includes a fixture or building covering material adhered to a framing structure with an adhesive system. The adhesive system provides both an immediate holding strength of the fixture to the framing structure, and a long-term bonding strength of the attached fixture to the framing structure.

One advantage of the present invention is that the adhesive system does not require attaching of the fixture to the framing structure with any additional securing means such as nails or screws.

Another advantage of the present invention is in the speed of installation of the fixture to the framing structure. The adhesive system allows the installer to quickly and securely install the fixture to the framing structure in a one step process. Also, in certain end use applications, the construction configuration can be installed without the need for skilled workers such as carpenters, masons and the like.

In certain embodiments, the adhesive system can be applied in an automated fashion to the fixture such that the subsequent installation of the fixture onto the framing structure is greatly simplified. The adhesive system eliminates the previous requirement for the manual labor involved in applying a bead of glue to a fixture and then nailing the glue laden fixture to the framing structure. The elimination of such nailing and gluing requirements, which often require the use of nail guns and other such types of equipment, also may provide safety advantages to the installer.

Another advantage of the construction configuration is that by using the adhesive system rather than a bead of caulk or glue, the amount and the precise location of the adhesive used on the fixture is controlled. Often, the amount of adhesive used is reduced, which results in savings.

Still another advantage of the present invention is the elimination of the industry practice of using polyurethane spray foams to attach fixtures to the framing structures. The present invention also eliminates material waste and extra labor and is safer than the use of such previous industry systems as polyurethane foams.

Yet another advantage of the adhesive system is the elimination of nails and/or screws in the framing structure itself. This elimination of nails and/or screws also reduces the vibrations being transmitted through the walls, floors and ceiling by the nails and/or screws during normal occupancy of the building, after the construction is completed. The use of the adhesive system is especially advantageous to reduce noise and vibrations when a manufactured stone product is installed as the fixture on the framing structure.

The adhesive system provides a continuous bond that is much stronger than if only nails/screws are used. The use of the adhesive system also is especially advantageous when a foam board product is used as a fixture for exterior sheathing.

According to one aspect, the adhesive system comprises a combination of at least two types of adhesive materials. The first adhesive material comprises at least one type of self-adhesive or pressure sensitive adhesive material. As used herein, the term "adhesive" is intended to mean a substance that is capable of bonding other substances together by surface attachment. Pressure sensitive materials have the desired viscoelastic properties which result in a desired balance of tack, peel adhesion, and shear holding power. The pressure sensitive materials provide an immediate adhering strength that allows the fixture to initially be held in place on or against the underlying framing structure.

The second adhesive material comprises at least one type of bonding adhesive material that can set or cure over time. In one embodiment, the second adhesive material is a mortar-type adhesive material. The bonding adhesive materials have "permanent bonding" properties that allow the fixture to have a long term bonding strength that develops over a period of time, often from many hours to several days. In certain embodiments, the bonding adhesive material has an initially low tensile strength, but set or cures over time to provide a high adhesive tensile strength. In certain embodiments, the bonding adhesive material can be, for example a suitable moisture curable polyurethane in the form of a high viscosity, thixotropic paste with isocyanate functionality.

It is to be understood that in certain embodiments, the bonding strength can be measured in tensile strength, also referred to as Degree Peel Adhesion, as measured in pounds per inch. In certain embodiments, the bonding adhesive material has a tensile strength (e.g. pounds per square inch) that is preferably at least twice that of the self-adhesive or pressure sensitive adhesive materials. In certain embodiments, the bonding adhesive material can have tensile strengths at least two (100 times) or three orders (1000 times) of magnitude greater than that of the pressure sensitive adhesive materials. In certain end use applications, the construction configuration is especially useful for adhering fixtures to framing structures through a level 3 earthquake.

Figure 3:
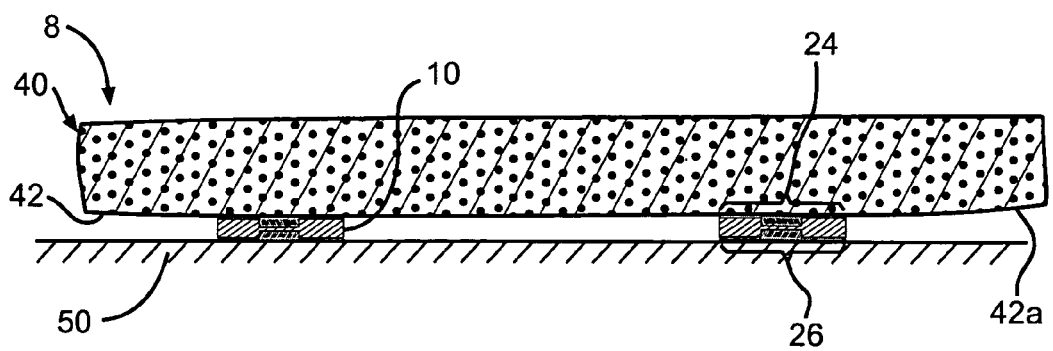
FIG. 3 is a schematic cross-sectional view of a fixture adhered to a framing structure with an adhesive system.

Referring first to FIG. 3, a construction configuration 8 is schematically illustrated. The construction configuration 8 generally includes one or more adhesive systems 10 for adhering a fixture 40 to a framing structure 50 of a building.

Figure 2:
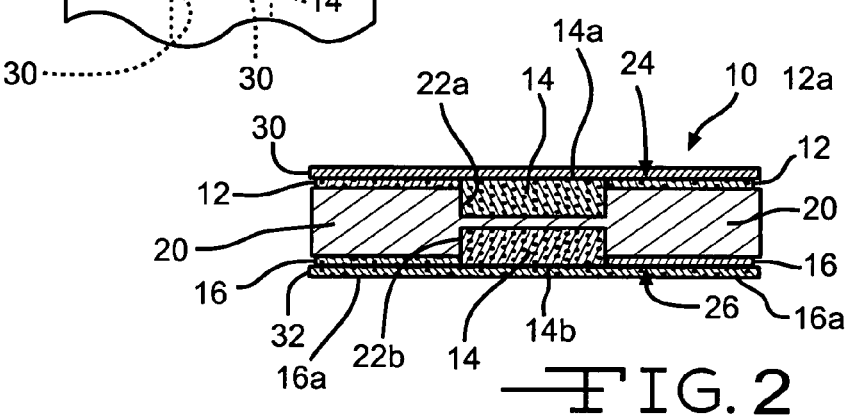
FIG. 2 is a cross-sectional view taken along the line 2-2 in FIG. 1.

FIGS. 1 and 2 show one embodiment of the adhesive system 10 which includes an outer, or first, pressure sensitive adhesive material 12, an inner, or second, pressure sensitive adhesive material 16, and a bonding adhesive material 14. It is to be understood that the terms "inner", "outer" and the like are used herein for ease of explanation, and the orientation of the adhesive materials in the adhesive system 10 will depend, at least in part, on the end use application.

The adhesive system 10 also includes a spacer material 20 which is positioned between the first pressure sensitive adhesive material 12 and the second pressure sensitive adhesive material 16. The spacer material 20 can be made of any suitable material such as a foam or rubber based material. In certain embodiments, the spacer material 20 has an appropriately selected complex modulus to selectively absorb and/or dampen sound energy and convert the sound energy to heat. In such embodiments, the heat energy may be used to aid in the curing of the bonding adhesive material 14.

In certain embodiments, the spacer material can comprise a rubber type material, an elastomeric material, or an open cell foam material or a closed cell foam material. Useful materials include polyurethanes, melamines and the like.

In certain embodiments, the spacer material can have a uniform density, thickness and/or stiffness; and in other embodiments, the spacer material can have a varying density, thickness and/or stiffness. In certain embodiments, the spacer material can have any suitable pattern or shape such as pyramidal, linear wedges, egg crate, baffled, x-ribbed and the like.

Further, in certain embodiments, as shown in the Figures herein, the spacer material 20 can substantially completely fill an area between the first pressure sensitive material 12 and the second pressure sensitive material 16. It is to be understood, however, that in other embodiments, the spacer material can occupy less than the entire area between the first pressure sensitive material 12 and the second pressure sensitive material 16.

Depending on the end use requirement, the adhesive system 10 can be made with the depth and width of the spacer material 20 selected to achieve a desired vibration isolation of a specified frequency spectrum.

In the embodiment shown in FIG. 2, the spacer material 20 includes a first opening 22a and a second, and opposing, opening 22b; however, it should be understood that the spacer material 20 can define one opening which extends through the spacer material 20. The opening diameter and depth may also be varied to achieve specific vibration isolation characteristics relative to the desired frequency spectrum to be treated.

For ease of explanation with respect to at least FIGS. 1-3, only one opening 22 will be discussed in detail. As such, it should be understood that the present invention also contemplates an adhesive system 10 that includes more than opening 22. The opening 22 can have any suitable configuration to hold a desired amount of the bonding adhesive material 14. It is desired that the amount of bonding adhesive material 14 be adequate to adhere the fixture 40 to the framing structure 50 with a high strength bond. Also, the location of the opening 22 in the spacer material 20 is determined by the type of fixture 40 which is being secured to a particular type of framing structure 50. As such, the tack requirements for the bonding adhesive material 14 and the first pressure sensitive material 12 and the second pressure sensitive material 16, can depend, at least in part, on the end use applications. Also, in certain embodiments, such tack requirements can also take into consideration the end use environmental requirements such as expected changes in temperatures, humidity and the like.

The adhesive system 10 provides an outer bonding surface area 24 which is defined by a bonding surface area 12a of the outer pressure sensitive adhesive material 12 and a first bonding surface area 14a of the bonding adhesive material 14. In certain embodiments, the outer pressure sensitive bonding area 12a and the first bonding adhesive bonding area 14a are coplanar such that the outer bonding area 24 is substantially planar.

The adhesive system 10 also provides an inner bonding surface area 26 which is defined by a bonding surface area 16a of the outer pressure sensitive adhesive material 14 and a second bonding surface area 14b of the bonding adhesive material 14. In certain embodiments, the inner pressure sensitive bonding area 16a and the second bonding adhesive bonding area 14b are coplanar such that the inner bonding surface area 26 is substantially planar.

The bonding surface areas 12a, 14a, 16a and 14b allow the fixture 40 to be adhered to the framing structure 50. The adhesive system 10 is especially useful in adhering fixtures having different chemistries and/or textures to framing structures having chemistries and/or textures that are normally incompatible with the fixtures. Also, in certain embodiments, the adhesive system 10 is flexible so that the adhesive system 10 will readily adhere to a back surface 42 of the fixture 40 that is not completely smooth and/or planar.

The sizes, shapes and thicknesses of the bonding surface areas 12a, 14a, 16a and 14b, will depend, at least in part, on the end use application. Also, the chemistries of the outer pressure sensitive adhesive material 12, the bonding adhesive material 14, and the inner pressure sensitive adhesive material 16 will depend, at least in part, on the end use applications. As such, the inner and outer pressure sensitive adhesive materials 12 and 16 can be comprised of any suitable pressure sensitive adhesive materials that hold the fixture 40 to the framing structure 50 for a length of time sufficient to allow the bonding adhesive material 14 to be activated, set or cured.

Also, in certain embodiments, when the adhesive system 10 is not immediately applied to the fixture 40, the adhesive system 10 can also include an outer, or first, removable film 30 that is removably adhered to the outer bonding surface 24. The first removable film 30 protects the outer pressure sensitive adhesive material 12 and the bonding adhesive material 14 when the adhesive system 10 is not in use. The first removable film 30 also prevents the bonding material 14 from being exposed to the air until it is time for the bonding adhesive material 14 to set or cure.

It is desired that the first removable film 30 be compatible with the outer pressure sensitive adhesive material 12 such that the first removable film 30 is easy to peal away from the outer sensitive adhesive material 12. In certain embodiments, the first removable film 30 can be metallized polyethylene films or polyvinyldine chloride films, such as Saran ® film.

In certain embodiments, when the adhesive system 10 is not immediately adhered to the framing structure 50, the adhesive system 10 can also include an inner, or second, removable film 32 that is removably adhered to the inner bonding surface 26 of the adhesive system 10. The second removable film 32 protects the inner pressure sensitive adhesive material 16 and the bonding adhesive material 14 before the fixture 40 is adhered to the framing structure 50.

It is desired that the second removable film 32 be compatible with the inner pressure sensitive adhesive material 16 such that the second removable film 32 is easy to peel away from the inner sensitive adhesive material 16. In certain embodiments, the second removable film 32 can be metallized polyethylene films or polyvinyldine chloride films, such as Saran ® film.

In certain embodiments, for example where a moisture curable bonding adhesive material 14 is used, the first removable film 30 and/or the second removable film 32 can be moisture impermeable so that the bonding adhesive material is kept from curing until such time that the removable films are removed and the adhesive system is used. In such embodiments, the first removable film 30 and/or the second removable film 32 can be, for example, but not be limited to, a suitable acrylic emulsion or ethylene vinyl acetate type of material.

It is further to be understood that the combinations of outer pressure sensitive adhesive material 12 and the first removable film 30 and/or the combinations of the inner pressure sensitive material 16 and the first removable film 32 can be formulated to meet desired compatibility requirements for the compositions comprising such adhesives and/or films. For example, the outer pressure sensitive adhesive material 12 can comprise a suitable adhesive material that adheres to the fixture 40, while the inner pressure sensitive adhesive material 16 can comprise the same, or a different, suitable adhesive material that adheres to the framing structure 50.

Also, in certain embodiments, it is desired that the outer pressure sensitive adhesive material 12 and the bonding adhesive material 14 be compatible, or inert, with respect to each other such that no unfavorable chemical reaction occurs between the outer pressure sensitive adhesive material 12 and the bonding adhesive material 14.

Likewise, it is desired that the inner pressure sensitive material 16 and the bonding adhesive material 14 be compatible, or inert, with respect to each other such that no unfavorable chemical reaction occurs between the inner pressure sensitive material 16 and the bonding adhesive material 14. In certain embodiments the outer pressure sensitive material 14 and the inner pressure sensitive material 16 can be the same type of adhesive, while in other embodiments, they can be comprised of different types of adhesive.

According to another aspect of the present invention, the size, shape and chemistries of the pressure sensitive materials 12 and 14 and the bonding adhesive material 16 can be changed to suit various types of construction configuration and to meet the needs of the end use applications. Examples of such various construction configurations include the adherence of diverse materials including drywall, OSB (oriented strand board), open bulk molded compound sheathing, sheet molding compounds, plastic, metal, plywood, granite, slate, concrete, wood, stone, manufactured stone, fiberglass and glass. For example, the construction configuration can include the adherence of: plastic to plastic, metal to plastic, fiberglass to manufactured stone, plywood to plywood, countertop materials such as granite to granite, wood to concrete, concrete to concrete, and the like.

In certain embodiments, the fixture 40 is an exterior material such as, for example, a manufactured stone material or a brick material. For example, depending on the type of manufactured stone, the manufactured stone can have either a smooth or rough back surface 42. In such embodiments, where the fixture 40 comprises a manufactured stone, the back 42 of the manufactured stone fixture 40 often has a micro-roughness variation caused by the aggregate in the manufactured stone fixture 40.

Also, as schematically illustrated in FIG. 3, the manufactured stone fixture 40 can have an "out of plane" surface, or taper, illustrated at 42a, across the back surface 42 of the stone fixture 40. Where the fixture is a manufactured stone product, for, example, this out of plane condition can be caused by an under pour or over pour of the concrete mixture comprising the manufactured stone. In the past, the manufactured stone often needed a scratch coat, or intentional variation, formed in the back surface in order to improve adherence of the mortar to both the manufactured stone and the framing structure. The need for such a scratch coat is eliminated by the construction configuration 8 of the present invention. During application of the adhesive system 10 to the fixture 40, the outer bonding surface area 24 is brought into contact with the back surface 42 of the fixture 40. The adhesive system 10 provides a flexible system which allows a substantial part of the outer bonding surface area 24 to substantially conform to any variations in the back surface 42 of the fixture 40.

Also, in embodiments where the spacer material 20 comprises a compressible material such as a flexible foam material, during installation, the compressible spacer material 20 can be either compressed or allowed to be fully expanded such that the adhesive system 10 is substantially in contact with both the fixture 40 and the framing 15 structure 50.

In certain embodiments, the spacer material 20 can be chosen for specific noise isolation applications. For example, in one embodiment, the adhesive system 10 is designed to be useful with different types of wall applications, such as studs, while another embodiment is designed to be used with sub-floor applications, such as floor joists. It should be noted that the thickness profile and the material characteristics, including, the vibration damping characteristics, of the spacer material 20 may significantly change depending on the desired end-use application. It should be noted that if sound isolation is not a concern, then a lower cost adhesive system 10 with a non-damping spacer material 20 can be used.

In another example, fiberglass ba fts (not shown) can have the adhesive system 10 applied to each batt during the batt manufacturing process. The adhesive system 10 can have the second pressure sensitive material 16 on the outer face of the batt. The second removable film 32 can then be removed, thereby allowing attachment of the batt to the framing structure during installation.

In another example, some wall applications require more than one sheet of gypsum wall board. In the past, the gypsum board sheets in the outer layer are typically screwed through the underlying gypsum board layer to the main stud framing structure. Typical screw applications of gypsum board to wood studs cause torsional forces from the gypsum board to couple vibrations to the main stud assembly. These vibrations are then transmitted to the adjacent gypsum layer on the other side of the wall thus causing increased levels of noise to transmit through walls. This need for screwing through the board can be eliminated since the adhesive system 10 can be applied to each layer or sheet, thus eliminating the need for screws. By eliminating screws, such embodiments of the present invention also provides acoustical advantages.

In certain embodiments, the spacer within the adhesive system can significantly increase sound isolation characteristics within the frequency range most sensitive to the human ear. These clearly noticeable differences may be indicated, from a change in the partition's transmission los performance alone. The range and amount to which the spacer isolates sound transmission will depend on the spacer's specific design characteristics. Thus, the adhesive system 10 of the present invention provides sound isolation characteristics comparable to other types of wall, ceiling, or floor noise control application but with considerable less labor and cost.

The adhesive system 10 can be manufactured in any suitable configuration.

FIG. 1 shows tape or strip configuration of the adhesive material 10. In such tape configurations, any desired length of tape can be used to attach the fixture 40 onto the framing structure 50. The tape configuration of the adhesive system 10 can be supplied as sheets having defined lengths, or as a roll of the adhesive system 10. The bonding adhesive material 14 can be a continuous strip extending along substantially the length of the adhesive system 10. In certain other embodiments, at least the bonding adhesive material 14 can be a defined or finite length rather than a continuous length. For example, FIG. 1 shows a gap 34 between adjacent lengths of the bonding adhesive materials, indicated as 14 and 14'. In the gap 34, there can be a supply of the spacer material 20. Also, the outer removable film 30 can have identifying indicia 36 which show the installer where the adhesive system can be cut without exposing any of the bonding material 14.

According to another aspect of the present invention, the adhesive system 10 can be applied to the fixture 40 or to the framing structure 50 through an automated process at a point well prior to the installation of the fixture 40 to the framing structure 50. The adhesive system 10 can be very quickly applied to the fixture 40, thus allowing the customer to build an inventory of fixtures and framing structures to be used as needed.

Figure 4:
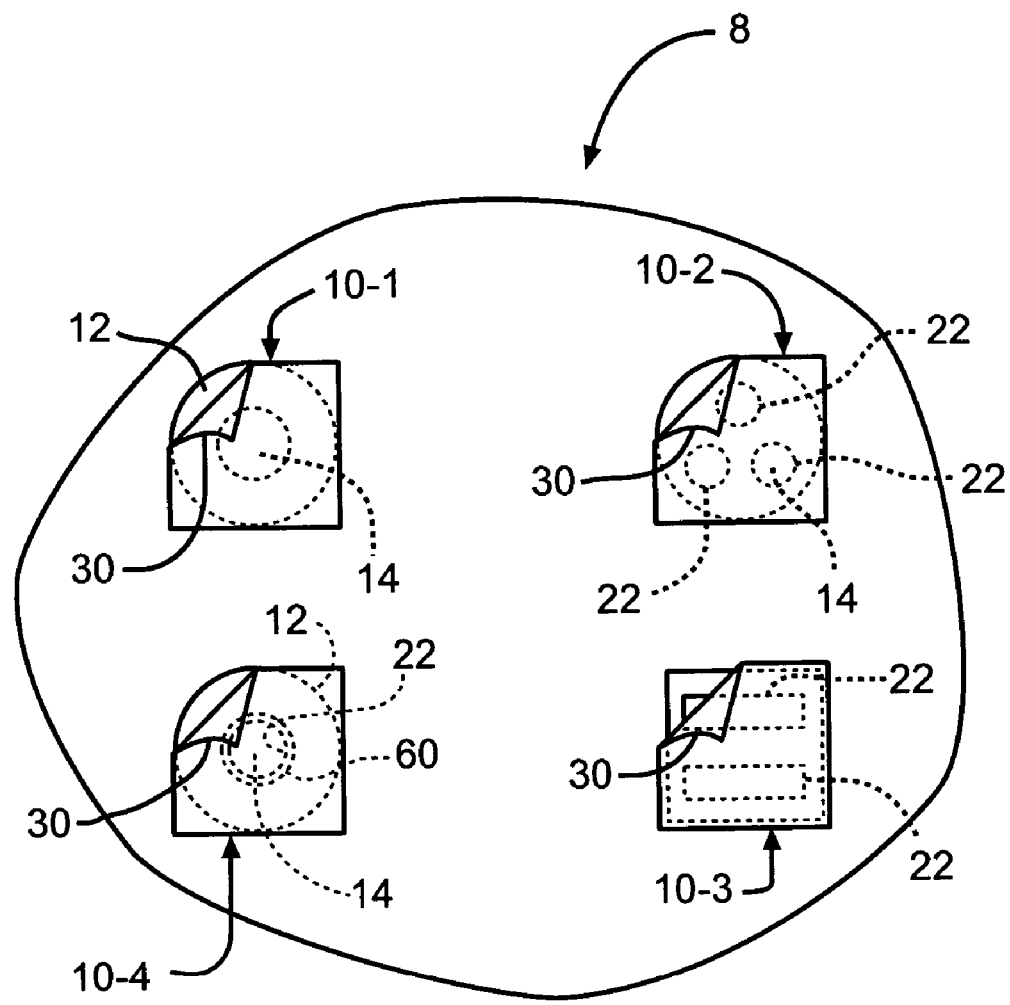
FIG. 4 is a schematic illustration showing different configurations of adhesive systems.

Referring now to FIG. 4, schematic illustrations of several suitable adhesive systems 10 that can be used are shown. The adhesive system 10-1 shows an embodiment where the outer pressure sensitive material 12 and the inner pressure sensitive material 16 have a generally circular shape. The opening 22, filled with the bonding adhesive material 14, has a generally cylindrical shape, as defined by the spacer material 20.

The adhesive system 10-2 shows a plurality of upper openings 22 spaced along the outer surface 24 of the spacer material 20. While not shown, the adhesive system 10-2 can have a plurality of lower openings spaced along the inner bonding surface area 26 of the spacer material 20. The lower openings can be in alignment with the upper openings, or can be offset from the upper openings.

In another embodiment, the adhesive system 10-3 has one or more rectangular shaped and longitudinally positioned openings 22. The orientation of such longitudinally positioned openings 22 can be determined by the desired end use application. For example, one such end use application can include an application where more bonding strength is needed to hold the fixture in a particular orientation.

The adhesive system 10-4 shows an embodiment where the outer pressure sensitive material 12 is separated from the bonding adhesive material 14 by a barrier material 60. The barrier material 60 keeps the adhesive bonding material 14 from coming into contact with the pressure sensitive adhesive materials 12 and 16 and the spacer material 20. While certain embodiments of the present invention do not require such barrier material 60, it is useful in other embodiments to further prevent any contacting of the bonding adhesive material 14 with the other materials of the adhesive system 10, at least until the adhesive system 10 is being used to secure the fixture 40 to the framing structure 50.

In another embodiment (not shown), the spacer 20 is not required. The fixture 30 includes the an adhesive system having at least one pressure sensitive adhesive 12 material and at least one bonding adhesive material 14. More than one adhesive system may be used, for example, one pressure sensitive adhesive adhered to a fixture 30 including several bonding adhesive materials 14. Alternatively, several pressure sensitive adhesives, including bonding adhesives which may be affixed to the fixture 30.

While the invention has been described with reference to various embodiments, it should be understood by those skilled in the art that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A construction configuration for a building comprising:
    a building covering material adhered to a framing structure with a bonding system, the bonding system having the following structure:
        an outer pressure sensitive adhesive adhered to the building covering material;
        an inner pressure sensitive adhesive adhered to the framing structure;
        at least one spacer positioned in an area defined between the inner and outer pressure sensitive adhesives, wherein the at least one spacer defines at least one opening between the inner and outer pressure sensitive adhesives; and
        a bonding adhesive positioned within the at least one opening defined by the spacer and in contact with at least one of the building covering materials or framing structure, wherein the bonding adhesive is a curable adhesive configured to increase in strength overtime.

2. The bonding system of claim 1, further including a first removable film removably adhered to the outer pressure sensitive adhesive and a second removable film removably adhered to the inner pressure sensitive adhesive.

3. The bonding system of claim 2, wherein the first and the second removable films substantially prevent the bonding adhesive from setting or curing until the first and second removable films are removed from the bonding system.

4. The construction configuration of claim 1, wherein the spacer comprises a material adapted to isolate, absorb and/or damp sound energy.

5. The bonding system of claim 4, wherein the spacer converts sound energy to heat.

6. The bonding system of claim 5, wherein the heat formed from the sound energy is used to aid in the curing of the bonding adhesive.

7. The bonding system of claim 1, wherein the bonding adhesive is in contact with both the building covering material and the framing structure.

8. The bonding system of claim 1, wherein the spacer has a uniform thickness.

9. The bonding system of claim 1, wherein the spacer has a baffled pattern.

10. The construction configuration of claim 1, wherein the spacer substantially fills the area between the inner and outer pressure sensitive adhesive materials.

11. The construction configuration of claim 1, wherein the opening in the spacer has a depth and width such that the construction configuration has a desired vibration isolation at specified frequencies.

12. The construction configuration of claim 1, wherein the outer and inner pressure sensitive adhesive provide an immediate adhering strength that allows the building covering to initially be held in place on the framing structure, and wherein the bonding adhesive sets or cures over tune.

13. The construction configuration of claim 1, wherein the bonding system provides an outer bonding surface area which is defined by an outer pressure sensitive adhesive bonding surface area and a first bonding adhesive surface area; and wherein the bonding system provides an inner bonding surface area which is defined by an outer pressure sensitive adhesive bonding area and a second bonding adhesive surface area.

14. The construction configuration of claim 1, wherein the bonding adhesive comprises a moisture curable polyurethane in the form of a high viscosity, thixotropic paste with isocyanate functionality.

15. The construction configuration of claim 1, wherein the bonding adhesive has, in a cured state, a tensile strength that is at least twice that of the outer and inner pressure sensitive adhesive.

16. The construction configuration of claim 1, wherein the bonding adhesive has, in a cured state, a tensile strength at least two orders of magnitude greater than that of the outer and inner pressure sensitive adhesive.

17. The construction configuration of claim 1, wherein the outer and inner pressure sensitive adhesive and the bonding adhesive are inert with respect to each other such that no unfavorable chemical reaction occurs between the outer and inner pressure sensitive adhesive and the bonding adhesive.

18. The construction configuration of claim 1, wherein the bonding system has a tape or strip configuration.

19. The construction configuration of claim 1, wherein the bonding system has a generally circular shape.

20. The construction configuration of claim 1, wherein the bonding system includes more than one opening.

* * * * *